July 3, 1962 J. S. ALFORD ET AL 3,041,825
FLOW STABILIZING MEANS FOR CONVERGING-DIVERGING NOZZLE
Filed Nov. 18, 1958 2 Sheets-Sheet 1

INVENTORS.
JOSEPH S. ALFORD
RICHARD P. TAYLOR
BY Robert B. Crowell
ATTORNEY

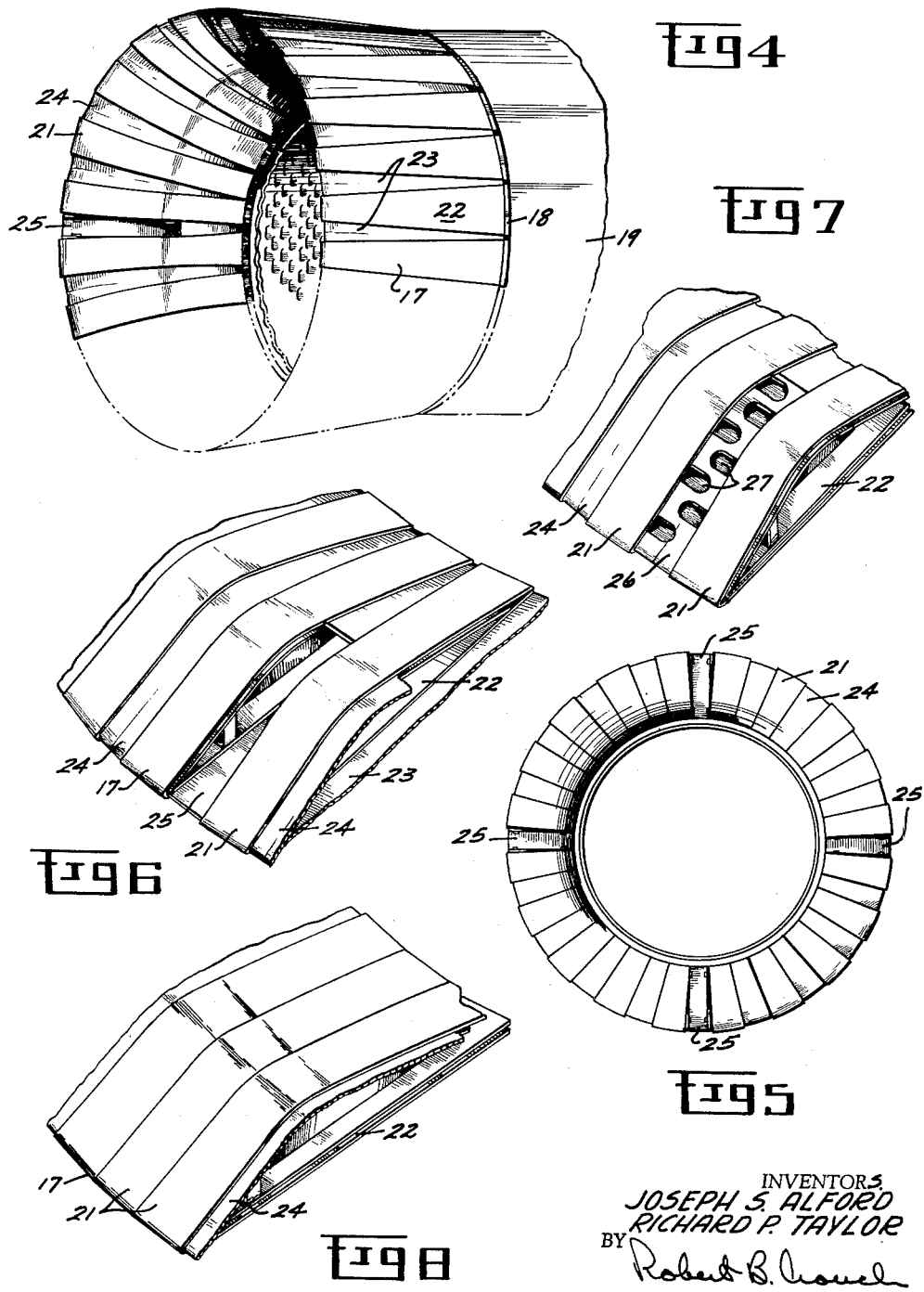

United States Patent Office 3,041,825
Patented July 3, 1962

3,041,825
FLOW STABILIZING MEANS FOR CONVERGING-DIVERGING NOZZLE
Joseph S. Alford and Richard P. Taylor, Cincinnati, Ohio, assignors to General Electric Company, a corporation of New York
Filed Nov. 18, 1958, Ser. No. 774,718
3 Claims. (Cl. 60—35.6)

The present invention relates to a flow stabilizing means for convergent-divergent exhaust nozzles and more particularly to means for correcting flow instability occurring in the divergent portion of such nozzles.

Convergent-divergent exhaust nozzles, such as presently used in jet engines for efficient supersonic flight, consist in essence of a convergent section which serves to accelerate the exhaust gas to sonic velocity, followed by a divergent section which expands the exhaust gas to supersonic speed. It is common to form the divergent section by means of a mechanical wall against which the expanding gas exerts a reaction to increase the effective thrust of the engine. To expand the gases efficiently, the nozzle exit area (outlet of divergent section) must bear a definite relation to the nozzle throat area (outlet of convergent section). Since the nozzle exit area required for optimum performance varies with aircraft speed, the ratio between exit area and throat area is usually selected for high performance at an intermediate flight speed. At off-design points, in particular at low flight speeds, the pressure ratio across the nozzle is not large enough for full expansion of the exhaust gases to the nozzle exit. The gas flow then separates from the diverging walls with a resulting shock wave. Under many circumstances, such as small divergence angles and unsteady inlet flow, aerodynamic flow instability is precipitated and the shock wave position fluctuates. This flow instability results in severe buffeting of the nozzle which may lead to rapid failure of the mechanical parts. It also causes variations in amount of engine thrust as well as deflection of the engine thrust axis, both of which cause aircraft control problems.

An object of the present invention is the provision of means for correcting flow instability occurring in convergent-divergent exhaust nozzles during operation at off design points.

The present invention corrects the flow instability which occurs in the divergent section of a convergent-divergent exhaust nozzle during operation of the nozzle at off design points by provision of means for stabilizing the position of the shock wave front which results when the exhaust gas flow separates from the walls of the divergent section. This stabilizing means takes the form of spaced openings in the wall of the divergent section connecting the areas of varying pressures behind and ahead of the shock front to restore the shock wave front to its initial position whenever it is displaced by a change in engine operating conditions.

Other objects and many of the intended advantages of this invention will be readily appreciated as the same becomes understood by reference to the following detailed description when considered in connection with the accompanying drawings wherein:

FIG. 4 is a perspective view of a variable convergent-divergent exhaust nozzle embodying the present invention;

FIG. 5 is an end view of the nozzle of FIG. 4 in its open position;

FIG. 6 is a perspective view at an enlarged scale of a portion of the nozzle of FIG. 4 illustrating the construction of the stabilizing slot;

FIG. 7 is a perspective view similar to FIG. 6 of an alternative form of construction;

FIG. 8 is a perspective view at an enlarged scale of a portion of the nozzle of FIG. 4 in its closed position.

Figure 1:
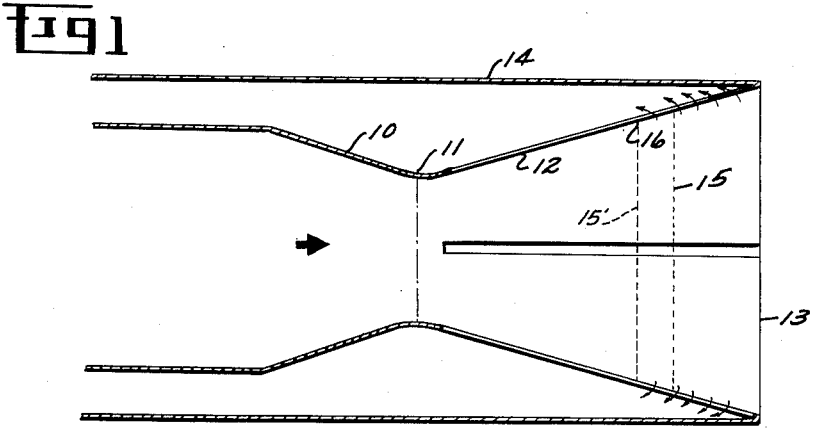
FIG. 1 is a schematic representation of a fixed convergent-divergent nozzle employing the present invention.

Referring more particularly to FIG. 1 of the drawing, a fixed convergent-divergent nozzle is depicted in schematic form as including a converging section 10 which defines the throat 11, and a diverging section 12 which defines the exit 13. A wall 14 surrounds the nozzle and with diverging section 12 defines a plenum chamber therebetween.

Figure 2:
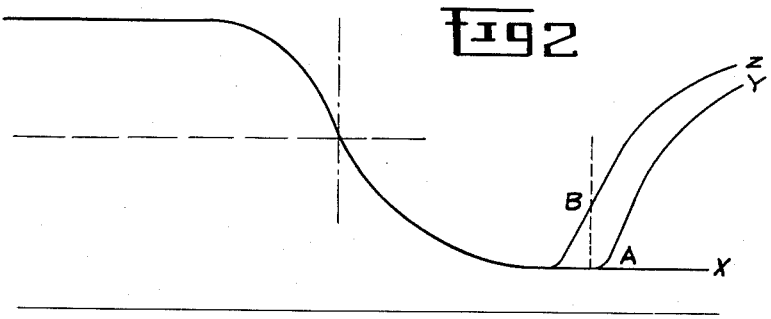
FIG. 2 is a plot of static pressure distribution along the nozzle of FIG. 1.

For frictionless adiabatic expansion of a gas in a convergent-divergent nozzle properly designed for the final pressure of the region into which the nozzle discharges, the static pressure ratio plotted against nozzle length will have a form shown by line $x$ of FIG. 2. Subsonic flow occurs upstream of the throat section 11 and supersonic flow occurs in the divergent length 12 of the nozzle.

If the static pressure of the region into which the nozzle discharges is gradually increased above the design level value, oblique shock waves first form at the exit 13 of the nozzle, followed by a normal shock wave or front 15 which advances up the nozzle towards the throat 11. This condition is called over-expanded nozzle operation. As the shock wave front reaches the throat it disappears, and at the same time all supersonic velocities within the nozzle vanish. Lines $y$ and $z$ of FIG. 2 show the static pressure distribution for two different pressure ratios causing over-expanded nozzle operation. The magnitude of the pressure increase which accompanies the shock wave front will vary with the position of the shock wave front in the nozzle, while the flow process downstream of the wave front will be one of subsonic compression.

FIG. 2 shows how the static pressure distribution along the nozzle varies with the nozzle pressure ratio. Although these curves in FIG. 2 indicate a variation in discharge pressure which causes the shock wave front to move axially, variations of inlet pressure will also change the nozzle pressure ratio and cause a shift in position of the shock wave front. Roughness in the engine combustion process causes perturbations in nozzle inflow, pressure, and temperature, which in turn cause fluctuations in nozzle pressure ratio and position of the shock front in the divergent portion of the over-expanded nozzle.

Figure 3:
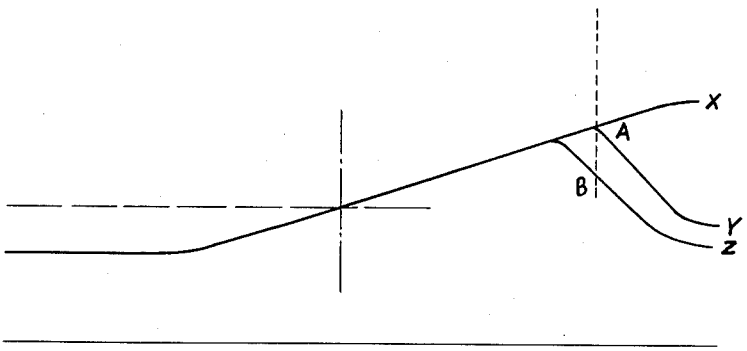
FIG. 3 is a plot of Mach number distribution along the nozzle of FIG. 1.

FIG. 3 shows the Mach number distribution along the nozzle and is an inverse plot of the static pressure distribution along the nozzle. Line $x$ is for a complete expansion, while lines $y$ and $z$ represent two degrees of over-expanded nozzle operation. A basic characteristic of supersonic flow, shown by comparing FIG. 2 and FIG. 3, is that a local drop in Mach number causes a corresponding rise in local static pressure.

To illustrate how the present invention stabilizes the flow in the over-expanded converging-diverging nozzle, consider a reduction in nozzle pressure ratio and an accompanying forward movement of the shock wave front from an initial position, indicated by line 15, to a new position indicated by line 15', caused by a momentary pertubation in the primary gas supply. This forward motion of the shock wave front causes the nozzle operation to shift from line $y$ to line $z$ of FIGS. 2 and 3 and produces a drop in the local Mach number in that zone of the nozzle where the front was located. This local drop in Mach number is represented by the change from A to B in FIG. 3. Now the local static pressure will rise as shown by the change from A to B in FIG. 2. The present invention takes advantage of the change in local static pressure to stabilize the position of the shock front by providing longitudinal openings, such as slots 16 of FIG. 1, spaced about the circumference of the diverging section of the nozzle. The slots 16 open into the plenum chamber formed by walls 12 and 14. The flow through each constituent portion of a slot is proportional to the static pressure drop across that portion. For each operating condition, the flow through each such portion may be considered as composed of a constant velocity with a fluctuating or decrement of flow caused by changes in the local static pressure. The rise in static pressure caused by the change from A to B in FIG. 2 will cause a change in the relative flow through the constituent portions of the slots 16 in the zone of the nozzle where the shock wave front is located. The arrows of FIG. 1 show the fluctuating increment of flow through the portions of the slots due to the increase in static pressure at A—B. This change in flow will relieve the increase of the static pressure at A—B, and hence will tend to compensate for the factors which cause the increase. That is, the motion of the shock wave front is arrested. The fluctuation in flow through the portions of the slot 16 provides effective damping, and causes a large reduction in the fluctuations of direction and amplitude of jet engine thrust.

The stabilizing means of the present invention is applicable to either a fixed or variable convergent-divergent exhaust nozzle. An example of this latter type is shown in FIG. 4 of the drawing. In this construction, the nozzle includes a plurality of axially extending fingers 17 pivotally connected at one extremity 18 to the downstream edge of the engine tailpipe 19. The fingers are three-dimensional and have inner and outer surfaces 21 and 22 respectively. Seals 23 span the spaces between the outer surfaces 22 of adjacent fingers 17 to prevent gas leakage and to provide a smooth nozzle configuration. Seals 24 span the spaces between the inner surfaces 21 of adjacent fingers to prevent gas leakage and assist in defining the convergent and divergent walls of the nozzle. Stabilizing slots 25 are formed in this configuration by omission of a portion of selected seals 24 as illustrated in FIG. 5. Referring to FIG. 6, the location and formation of the slot 25 is shown in greater detail. As shown, the downstream portion of the seal 24 extending over the diverging section of the nozzle from the throat to the exit is omitted. In this construction a plenum chamber is formed in the interior of the fingers 17 between surfaces 22 and seals 23 on the outside and surfaces 21 and seals 24 on the inside.

An alternative construction is shown in FIG. 7 in which the stabilizing opening is formed by perforating the downstream portion of the seal instead of omitting it. In this construction, the seal 26 is provided with a plurality of perforations 27 spaced along its length between the throat and exit of the nozzle. This particular construction has the advantage that through dimensioning and location of the perforations, the amount of gas flow discharging through various portions of the seal may be controlled as desired. Similar control may be imparted to slots 16 of FIG. 1 by varying their dimensions, as by tapering the width from one end of the slot to the other. The configuration of FIG. 7, that is, the use of spaced perforations instead of a continuous slot, may also be used with a fixed convergent-divergent nozzle such as is disclosed in FIG. 1.

As applied in FIGS. 6 and 7 the present invention has the advantage that the openings are exposed only during maximum speed conditions. A variable convergent-divergent nozzle such as depicted in FIGS. 4 and 5 is usually designed so that the fingers are extended (as shown) to form a convergent-divergent nozzle at maximum speed conditions. At cruise conditions for subsonic flight the fingers are retracted to form a convergent nozzle. In this latter condition, as shown in FIG. 8, the edges of adjacent fingers abut and the stabilizing openings are covered. This prevents any gas leakage through the openings, with corresponding thrust loss, during subsonic cruise conditions when flow instability presents no problem.

While particular embodiments of the invention have been illustrated and described, it will be obvious to those skilled in the art that various changes and modifications may be made without departing from the invention, and it is intended to cover in the appended claims all such changes and modifications that come within the true spirit and scope of the invention.

What is claimed is:

1. A convergent-divergent jet exhaust nozzle comprising: a converging wall which defines the throat area of the nozzle; a diverging wall which defines the exit area of the nozzle; a wall surrounding the diverging wall and forming a plenum chamber therebetween; and means for stabilizing the position of a shock wave formed within the diverging wall portion of the nozzle during overexpanded flow conditions, said means comprising a plurality of generally axially elongated slots opening through said diverging wall and spaced about the periphery thereof, said slots extending from adjacent the throat area to adjacent the exit area and connecting areas of varying local static pressure upstream and downstream of said shock wave to the plenum chamber for damping shock wave movement by communicating the local static pressure variations caused by shock wave movement to said plenum chamber.

2. A variable area convergent-divergent exhaust nozzle for a jet engine including: an inner variable convergent wall portion defining a throat area; an inner variable divergent wall portion defining an exit area; an outer wall portion, said outer wall portion and said inner divergent wall portion forming a plenum chamber therebetween; and means for stabilizing the position of a shock wave formed within said diverging wall portion of the nozzle during overexpanded flow conditions, said means comprising a plurality of generally axially-directed slots in said diverging wall portion spaced about the periphery thereof, said slots extending from adjacent the throat area to adjacent the exit area and connecting areas of varying local static pressure upstream and downstream of said shock wave to said plenum chamber for damping movement of the shock wave, and means to open said slots during supersonic operation of said engine and to close said slots during subsonic operation thereof.

3. A variable area convergent-divergent exhaust nozzle for use with a jet engine having a tailpipe open at its downstream end, said nozzle including: a plurality of movable finger members disposed circumferentially about said tailpipe and pivotally attached thereto adjacent said end thereof for movement between a first position wherein the ends of said finger members remote from their tailpipe attachment are spaced circumferentially from each other and a second position wherein said spacing is at least partially closed by said finger members, seal structure mounted for movement with said finger members including a plurality of seal members each spanning the space between two adjacent finger members, said seal structure and finger members in at least one of said positions thereof constituting an inner surface including a convergent wall portion defining a nozzle throat area and a divergent wall portion defining a nozzle exit area and further constituting an outer surface which together with said inner surface forms a plenum chamber therebetween; and means for stabilizing the position of a shock wave formed within said divergent wall portion of the nozzle during overexpanded flow conditions, said means comprising a plurality of openings through said seal structure extending from adjacent the throat area to adjacent the exit area thereof and connecting areas of varying local static pressure upstream and downstream of said shock wave to said plenum chamber for damping the movement of said shock wave, said finger members at least partially closing said openings when moved to said second position.

(References on following page)

References Cited in the file of this patent

UNITED STATES PATENTS

| | | |
|---|---|---|
| 2,625,008 | Crook | Jan. 13, 1953 |
| 2,709,337 | Markowski | May 31, 1955 |
| 2,811,828 | McLafferty | Nov. 5, 1957 |
| 2,853,852 | Bodine | Sept. 30, 1958 |
| 2,926,489 | Halford et al. | Mar. 1, 1960 |
| 2,971,327 | Moy et al. | Feb. 14, 1961 |

FOREIGN PATENTS

| | | |
|---|---|---|
| 998,358 | France | Sept. 19, 1951 |
| 654,344 | Great Britain | June 13, 1951 |
| 788,316 | Great Britain | Dec. 23, 1957 |